United States Patent [19]

Powell

[11] Patent Number: 5,797,426

[45] Date of Patent: Aug. 25, 1998

[54] CHECK VALVE AND TRAP ASSEMBLY

[76] Inventor: Edwin O. Powell, 6479 Bagley Rd., Millwood, Ga. 31552

[21] Appl. No.: 838,729

[22] Filed: Apr. 10, 1997

[51] Int. Cl.$^6$ .............................. F16K 15/04; F16K 31/20
[52] U.S. Cl. .................. 137/533.11; 137/433; 137/449; 137/533.15; 137/549
[58] Field of Search .................. 62/272, 285, 288, 62/289; 137/192, 201, 202, 409, 430, 433, 449, 533.11, 533.13, 533.15, 549, 550

[56] References Cited

U.S. PATENT DOCUMENTS

| | | | |
|---|---|---|---|
| 1,263,480 | 4/1918 | Stanford | 137/192 |
| 1,380,415 | 6/1921 | Putnam | 137/533.11 |
| 1,779,322 | 10/1930 | Leidecker | 137/533.13 |
| 1,906,277 | 5/1933 | McGee | 137/433 |
| 1,927,582 | 9/1933 | Denk | 137/533.13 |
| 2,278,715 | 4/1942 | Stoyke et al. | 137/533.13 |
| 2,767,732 | 10/1956 | Hodgson et al. | 137/426 |
| 2,813,538 | 11/1957 | Di Genova | 137/426 |
| 2,906,285 | 9/1959 | Rosten et al. | 137/433 |
| 2,920,644 | 1/1960 | Schulze et al. | 137/433 |
| 2,972,412 | 2/1961 | Lundeen | 137/192 |
| 3,489,164 | 1/1970 | Fujiwara | 137/433 |
| 4,258,742 | 3/1981 | Louthan et al. | 137/318 |
| 4,327,764 | 5/1982 | Biederman et al. | 137/433 |
| 4,606,365 | 8/1986 | Siposs | 137/433 |
| 4,742,842 | 5/1988 | Garneau et al. | 137/192 |
| 5,137,044 | 8/1992 | Orlowski | 137/533.11 |
| 5,146,947 | 9/1992 | Vetrini | 137/433 |
| 5,186,203 | 2/1993 | Oike | 137/192 |
| 5,421,360 | 6/1995 | Castaneda et al. | 137/433 |

FOREIGN PATENT DOCUMENTS

| | | | |
|---|---|---|---|
| 2000274 | 1/1979 | United Kingdom | 137/192 |

*Primary Examiner*—George L. Walton
*Attorney, Agent, or Firm*—Thomas C. Saitta

[57] ABSTRACT

A combination check valve and fluid trap device for connection to the outflow aperture of a condensate moisture drain system on an air conditioner, ice maker, cooler or like apparatus, the device comprising a ball float sealingly seated on a float seat within a housing, the float seat being connected to the outflow conduit of a generally U-shaped fluid trap having an inflow conduit for connection to the drain system, whereby water and gas are prevented from entering the fluid trap through the outflow conduit but excess water will move the ball float from the float seat to allow water to flow out of the outflow conduit. Preferably the fluid trap is provided with rotation means whereby the longitudinal axis of the inflow conduit can be adjusted relative to the longitudinal axis of the outflow conduit so that the two axes are not aligned in parallel.

7 Claims, 2 Drawing Sheets

CHECK VALVE AND TRAP ASSEMBLY

BACKGROUND OF THE INVENTION

This invention relates generally to devices to prevent liquid back flow and contaminate blockage within condensate moisture drains of apparati which produce condensate moisture, such as air conditioner or air handler units, ice makers, coolers, or the like, and especially for such apparati which produce negative pressure at the source of the condensate drains systems and which are located internally in buildings or houses, or mounted externally on roofs, and which must be provided with a moisture drain conduit system to remove condensate water from the unit for discharge external to the building or roof. More particularly, the invention relates to such devices which incorporate one-way check valves allowing passage of water in the outflow direction but which prevent passage of air, liquid or other matter in the inflow direction, which utilize fluid traps to allow for outflow even when the units are operating, and which are mounted at the terminus of the moisture drain conduit system.

In the operation of typical air conditioner units, coolers or ice makers, warm air is passed across evaporator tubes or coils to cool the air. Water vapor condenses on the evaporator coils and is collected in a drain pan beneath the evaporator tubes. Evaporation is usually not sufficient to keep up with the amount of water condensing into the pan and so the condensate water must be evacuated from the drain pan to prevent the water from overflowing the pan and damaging the building. Typically, a condensate moisture drain conduit system is provided which consists of a length of conduit pipes sufficient in size and length to direct the water to an externally mounted outlet opening, where the condensate water is allowed to pass to the ground. Because the air conditioner units have fans which draw air through the evaporator coils and because fans are often operated continuously to keep air circulating within a building, there is a constant negative pressure in the condensate drain pan area, typically in the range of 1" H$_2$O during operation but as much as 2"H$_2$O or more at fan start-up, depending on the size of the return air duct and grilles. In this situation, it is therefore necessary to provide a generally U-shaped fluid trap within the condensate drain conduit system to create a fluid seal against water and air being drawn in through the conduit system by the negative pressure from the air conditioner fan and to allow outflow of water through the drain system even when the unit is in operation. Should the water in the trap evaporate during periods of non-use there is no seal against suction of outside air into the system, and the constant negative pressure may prevent condensate moisture from being drained by the drain system, resulting in flooding and water damage to the building after the drain pan overflows. In many circumstances, proper installation of fluid traps is hampered by construction limitations due to the particular location of the air conditioner unit or like apparatus, whether the unit is positioned internally or externally. Additionally, it is often desirable to provide a check valve and fluid trap means for units which do not necessarily require this, since typical drain systems will readily clog.

It is an object of this invention to provide a combination one way, float-type, check valve and fluid trap easily connectable to the outflow opening of condensate moisture drain systems, to be used either as a primary fluid trap or a secondary fluid trap for systems having a fluid trap. It is a further object to provide such a device where the fluid trap is easily adjustable out of vertical for installation in tight quarters, which has secondary drain apertures in case the primary drain apertures become clogged, and which is easily cleanable or replaceable should blockage occur.

SUMMARY OF THE INVENTION

The invention is a combination one way check valve and fluid trap for condensate moisture drain systems of the type utilized with air conditioners or air handler units, coolers, ice makers or the like, and especially for use with such apparati which have fans creating negative pressure in the area of the inflow opening for the moisture drain system. The invention comprises in general a fluid trap assembly having a generally vertical inflow conduit member, a bottom conduit member or segment, and a generally vertical outflow conduit member, the outflow conduit member being directly connected to a one way check valve having a float member seated within a float seat, the float member able to be raised from the float seat by water flow through the outflow conduit member. The float member is retained within a housing having primary drain apertures on the bottom of the housing and, preferably, secondary drain apertures on the side of the housing. An O-ring seal composed of an elastomeric material is positioned within the float seat. The fluid trap preferably comprises rotation means which allows the inflow conduit member of the trap to be positioned at angles out of true vertical while maintaining the outflow conduit member and float housing in true vertical.

DETAILED DESCRIPTION OF THE INVENTION

With reference to the drawings, the invention will now be described in detail with regard to the best mode and the preferred embodiment. In general, the invention is a combination fluid trap and check valve device for use with liquid drainage systems, and in particular for use with condensate moisture drainage systems used with air conditioner or air handler units, coolers, ice makers or like apparati, where it is desirable or necessary to drain fluid from the unit while preventing backflow of fluid and contaminants into the drain system.

Figure 1:
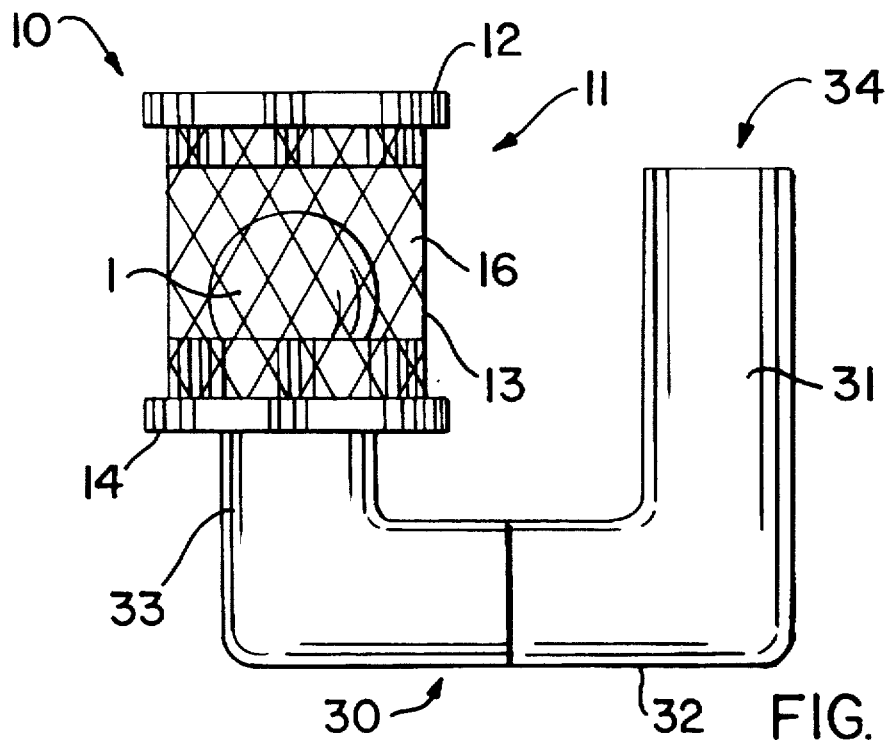
FIG. 1 is a side view of the invention.
Figure 2:
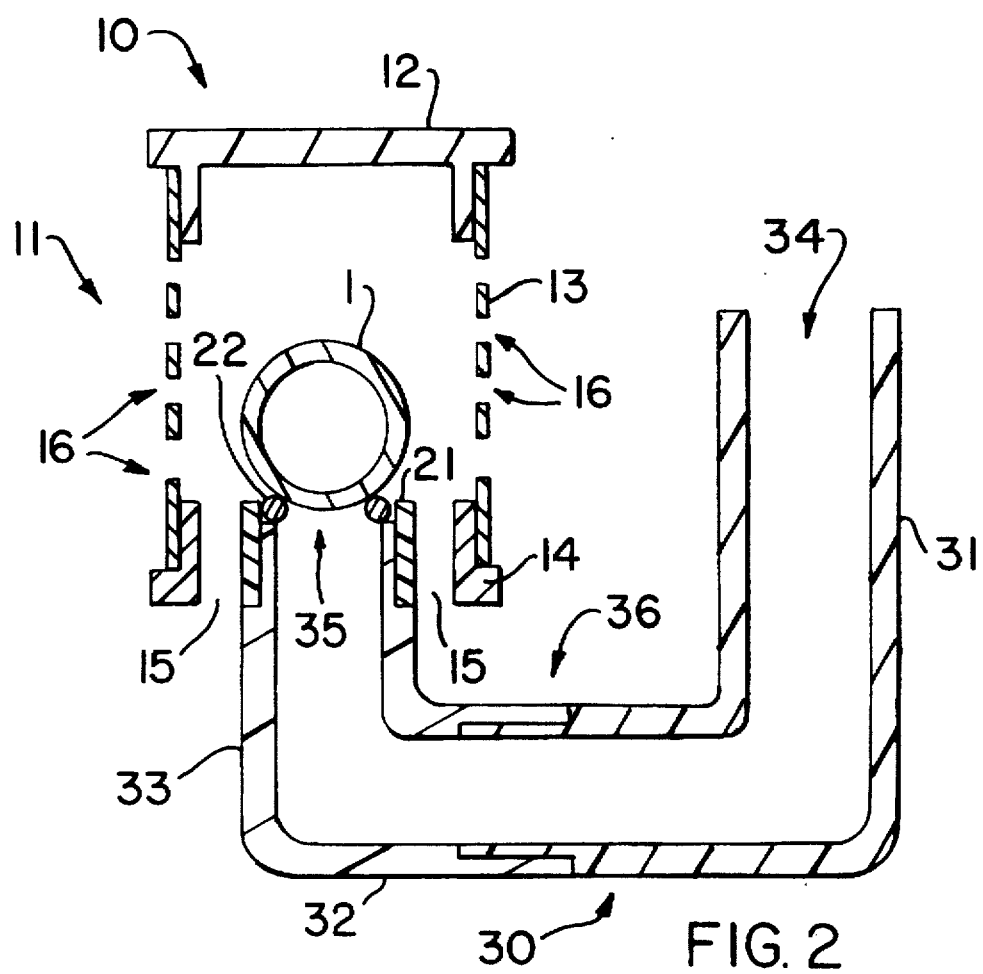
FIG. 2 is a cross-sectional view of the invention.

Referring now to FIGS. 1 and 2, the invention is seen to comprise in general a check valve assembly 10 and a fluid trap assembly 30, the fluid trap assembly 30 comprising a generally vertically oriented inflow conduit segment 31, a generally horizontally oriented bottom conduit segment 32 and a generally vertically oriented outflow conduit segment 33, where the check valve assembly 10 is directly connected to the outflow conduit segment 33 and the inflow conduit segment 31 is connected to the outflow opening of a drain system. The fluid trap 30 may be comprised of any suitable material, but is preferably composed of segments of PVC tubing joined in the usual manner to form the generally U-shaped fluid trap 30. As shown in the figures, the fluid trap 30 may be formed by joining two 90 degree elbow connectors having male/female connector fittings such that the junction in the bottom conduit segment forms a rotation means 36 when not fixed by adhesive. As will be explained in detail later, it is preferred that the two elbow connectors be free to rotate, such that the axis of inflow conduit segment 31 and the axis of outflow conduit segment 33 can be adjusted so as to be not parallel. The check valve assembly 10 may be permanently affixed to the outflow conduit segment 33 or removably mounted thereon. Preferably the internal diameter of the fluid trap assembly 30 is the same as the internal diameter of the condensate drain system such that water flow through the fluid trap assembly 30 is not restricted.

The check valve assembly 10 comprises in general a housing 11 mounted directly onto the outflow conduit segment 33 of the fluid trap 30, the housing 11 acting to retain a ball float 1. The float housing 11 comprises a cap member 12 and base member 14 connected by a sleeve member 13. Base member 14 contains primary drain apertures 15 which allow any fluid coming through outflow opening 35 of outflow conduit segment 33 to drain from the housing 11. Preferably, sleeve member 13 contains secondary drain apertures 16 which allow fluid drainage should the primary drain apertures 15 become clogged or blocked. Sleeve member 13 may be composed of PVC, as may base member 14 and cap member 12, or of metal, wire screen or any other suitable material. The combination of cap member 12, sleeve member 13 and base member 14 defines housing 11, which retains ball float 1 therein—the housing 11 allowing vertical movement of the float 1 but little or no lateral movement. The housing 11 may be permanently joined or non-permanently joined to allow the housing 11 to be removed form the fluid trap 30 to enable the trap 30 to be cleaned if necessary.

Figure 3:
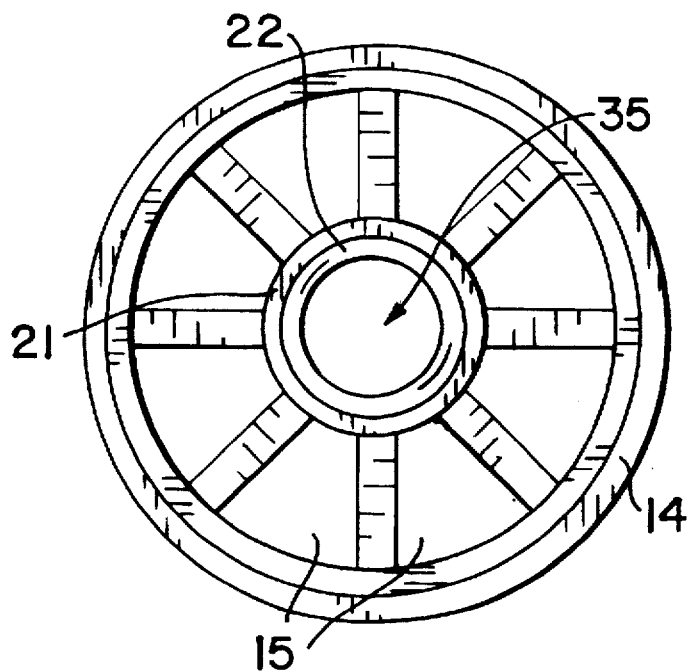
FIG. 3 is a top view of the housing base member, float seat and float seal.

The base member 14 of housing 11 contains a horizontally disposed annular float seat 21 to receive the round ball float 1, as seen in FIG. 3. Ball float 1 is made of any suitable lightweight material which floats on water, such as plastic. Preferably, float seat 21 contains an annular O-ring seal 22 composed of a generally flexible polymer of elastomer to provide a better seal against ball float 1. Float seal 22 may be coated with a silicon composition or the like to prolong the use life of the O-ring. In conjunction, ball float 1, float seal 21 and housing 11 act as a one way check valve which allows water to flow from the outflow opening 35 of outflow conduit segment 33 when there is sufficient water within fluid trap 30 to raise the float ball 1. When the excess water has been released, the ball float 1 will seat against float seal 22, thereby preventing water or air from entering the trap 30 and the drain system. When the air conditioner unit or like apparatus is creating negative pressure at the drain system inflow area, the combination of the water within the fluid trap 30 and the tight seal between the float 1 and the float seal 22 prevents any water from being drawn back through the drain system. Even without the negative pressure, the combination of check valve 10 and fluid trap 30 insure that no contaminants will enter the drain system. Should the water in fluid trap 30 evaporate completely, the check valve assembly 10 prevents air from being drawn through fluid trap 30 into the drain system, allowing condensate moisture to flow into the fluid trap 30 to refill it and create the additional backflow sealing means.

Figure 4:
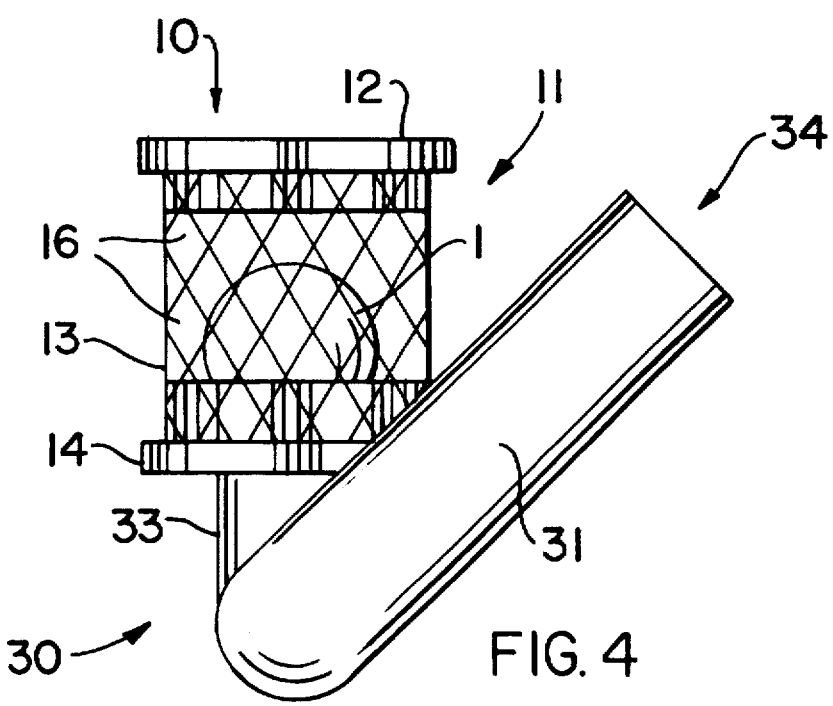
FIG. 4 is an end view showing the fluid tank positioned out of true vertical.

In the preferred embodiment, the orientation of a portion of the fluid trap 30 is adjustable relative to the orientation of the float housing 11, such that the longitudinal axis of the inflow conduit segment 31 and the longitudinal axis of the outflow conduit segment 33 and float seat 21 are not in parallel alignment. The axis of the outflow conduit segment 33 should be maintained in the true vertical orientation so that the float seat 21 remains horizontally disposed to receive the ball float 1, but in many circumstances it is desirable that the axis of the inflow conduit segment 31 be other than vertical, such as where the amount of ground clearance beneath bottom segment 32 is limited or the outflow opening of the drain system is not vertically oriented. For the trap 30 to function, the inflow opening 34 must be higher than the outflow opening 35. As long as this requirement is met, the two axes may be non-aligned. Preferably, the fluid trap 30 is provided with rotation means 36, shown in FIG. 1 as the non-glued combination of the male/female connectors between the two elbow components, but the rotation could also comprise an internally mounted sleeve at the juncture in the bottom segment 32 or other suitable means. The rotation means 36 allows the fluid trap 30 to be configured as shown in FIG. 4 with the inflow conduit member 31 shown at approximately 45 degrees, thereby shortening the overall height of the device.

It is understood that equivalents and substitutions to components and elements described above may be obvious to those skilled in the art. The true scope and definition of the invention therefore is to be as set forth in the following claims.

I claim:

1. A combination one way check valve and fluid trap device for use with fluid drain systems used to remove condensate moisture from apparati such as air conditioners, coolers and ice makers, the device comprising a float housing directly connected to a generally U-shaped fluid trap, said float housing containing a ball float positioned on a float seat, a float seal contained within said float seat, said float seal comprising an O-ring, said fluid trap comprising an inflow conduit segment having an inflow opening for connection to the outflow opening of a fluid drain system, an outflow conduit segment connected to said inflow conduit segment, said outflow conduit segment having an outflow outlet connected to said float seat, whereby said ball float is sealingly seated only on said float seal within said float seat unless water flows through said fluid trap, such that no water or gas can enter said fluid trap through said outflow opening.

2. The device of claim 1, where said float seat is generally horizontally disposed and said inflow opening is higher than said outflow opening.

3. The device of claim 1, where said housing comprises a base member having drain apertures, a cap member and a sleeve member connecting said base member to said cap member.

4. The device of claim 3, where said sleeve member contains secondary drain apertures.

5. The device of claim 1, where said outflow conduit segment has a longitudinal axis and said inflow conduit segment has a longitudinal axis, and where said inflow conduit axis is aligned parallel to said outflow conduit axis and said outflow conduit axis is generally vertically aligned.

6. The device of claim 1, where said outflow conduit segment has a longitudinal axis and said inflow conduit segment has a longitudinal axis, and where said inflow conduit axis is aligned non-parallel to said outflow conduit axis and said outflow conduit axis is generally vertically aligned.

7. The device of claim 1, where said outflow conduit segment has a longitudinal axis and said inflow conduit segment has a longitudinal axis, further comprising rotation means whereby said inflow conduit axis is adjustable relative to said outflow conduit axis.

\* \* \* \* \*